United States Patent Office 2,803,206
Patented Aug. 20, 1957

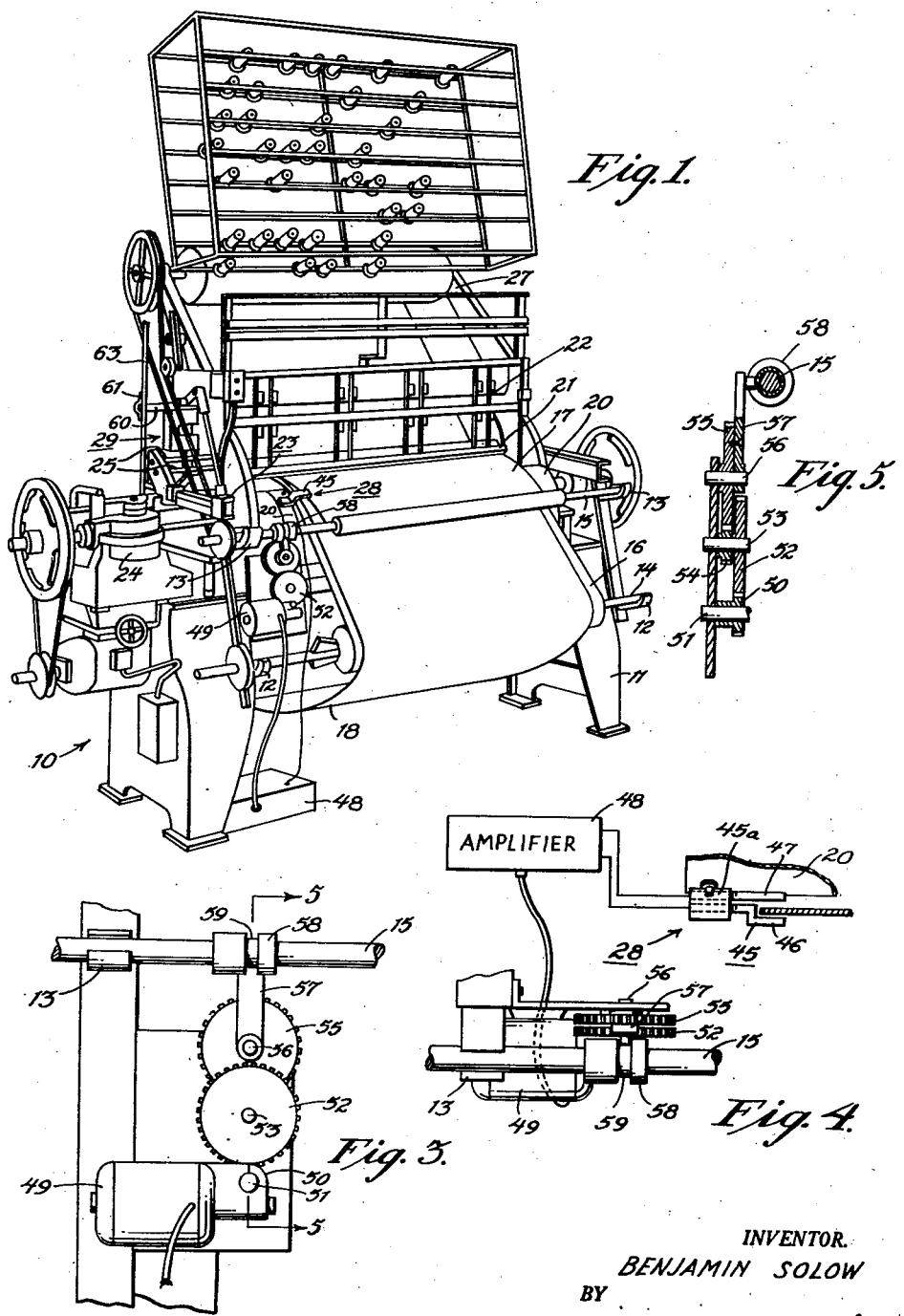

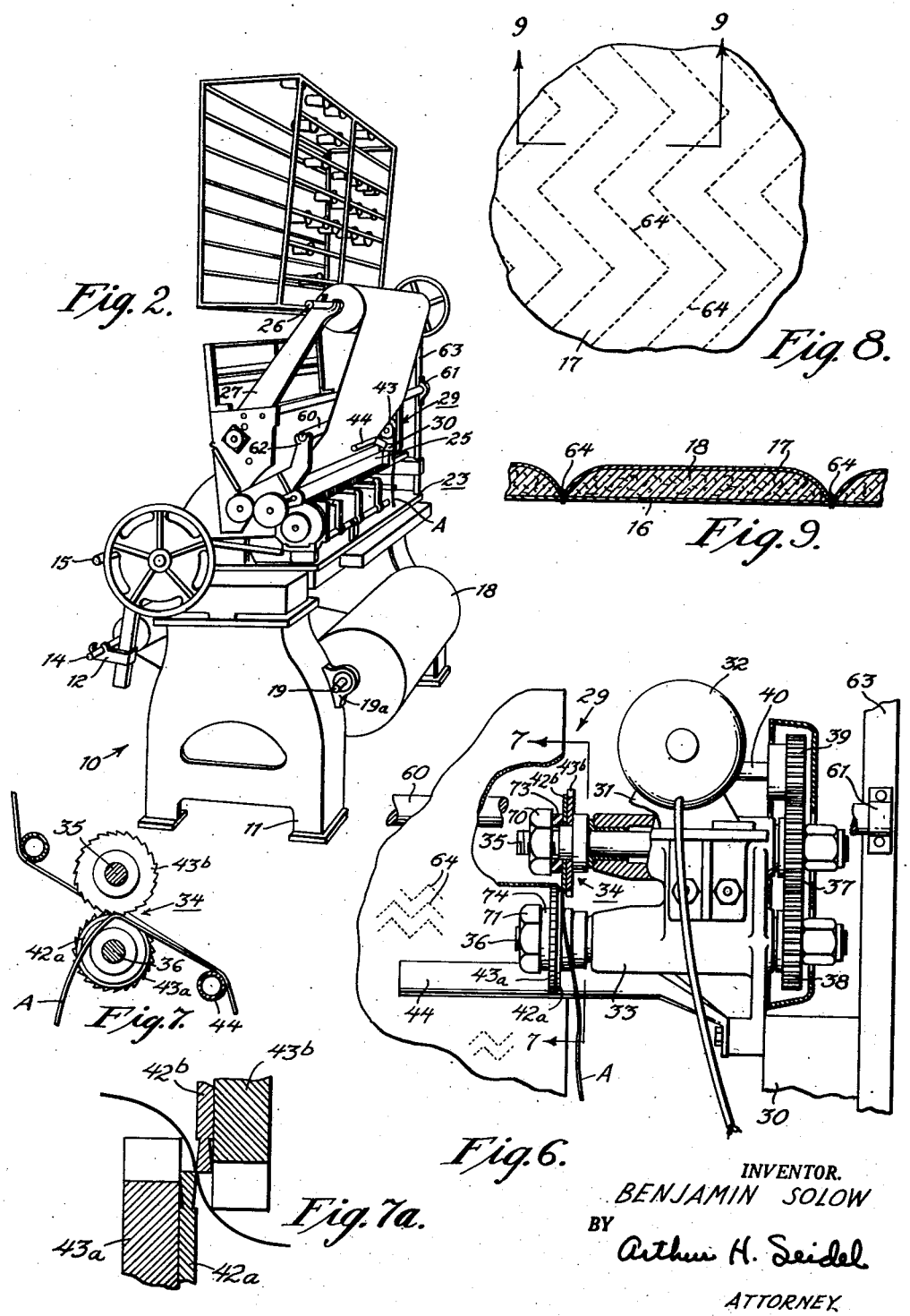

2,803,206

CUTTING MECHANISM

Benjamin Solow, Philadelphia, Pa.

Application September 13, 1955, Serial No. 534,101

14 Claims. (Cl. 112—124)

The present invention relates to a cutting mechanism or an edge trimmer mechanism, and more particularly, to a mechanism for making a straight edge on quilting material, batting pads and the like; and to a quilting machine that delivers a clean straight edged product.

The obtainment of a clean continuous and uniform straight edge for "fluffy" material such as quilting and batting is necessary for accurate layout work. Quilting material, which normally comprises a face of rayon or other fabric, and a backing of cheese cloth or other material, separated by wadding such as cotton or wool wadding; the whole joined together by design or straight line stitching—which stitching is effected by means of a quilting machine, has proved most difficult to edge-trim.

The use of pressure cutters, knives, etc. has proved unsatisfactory due to jamming, rapid dullness, etc. occasioned by the resilient and fluffy nature of the quilting material. Moreover, the obtainment of a clean edge without irregular projections of the wadding has proven most difficult due to the irregular spatial arrangement of the wadding fibers.

There is another and serious difficulty concomitant with the trimming of quilting, namely that the component cloth materials are not evenly or uniformly wound on their mandrels, and therefore the distance between the side edge and the outermost needle of the quilting machine varies. This variation may be as much as several inches per given roll, and indiscriminate cutting along a fixed line will cause the loss of valuable material, and in the case of a design stitched pattern may interfere with the resultant design.

In my earlier-filed patent application Serial No. 475,759, filed December 16, 1954, of which this application is a continuation-in-part, I disclosed a cutting mechanism capable of making a straight edge on quilting material, batting pads and the like, and a quilting machine that delivered a clean straight edged product. The cutting mechanism disclosed in my earlier filed application Serial No. 475,759 constituted the best mechanism yet developed for cutting quilting material.

The present application is directed to an improvement over the cutting mechanism disclosed in my patent application Serial No. 475,759, in which the efficient cutting action of the cutting mechanism disclosed in my application Serial No. 475,759 is improved even further, so as to permit facile cutting to be effected without an appreciable load on the motor which actuates the cutters.

This invention has as an object the provision of a useful cutter.

This invention also has as an object the provision of a trimmer capable of effecting facile trimming of quilting material and the like.

Another object of this invention is the provision of a trimming mechanism in which the cutting of the edge of quilting material and the like is effected with the minimal loss of quilting material.

A further object of the present invention is the provision of an edge cutter capable of cutting wadding or the like to yield a regular edge.

A still further object is the provision of a quilting machine that furnishes quilting material having a clean, continuous and uniform straight edge.

Another object is the provision of a quilting machine that furnishes quilting material having an edge evenly spaced from the adjacent stitching.

Other objects will appear hereinafter.

For the purposes of illustrating this invention, one form thereof, which is presently preferred, is shown in the accompanying drawings; it being understood, however, that the invention is not limited to the precise arrangements and instrumentalities illustrated.

Figure 1 is a front perspective and partly diagrammatic view of a quilting machine of the present invention with quilting material therein.

Figure 2 is a rear perspective and partly diagrammatic view of the quilting machine of the present invention with quilting material therein.

Figure 3 is a fragmentary front elevation of the edge controller portion of the quilting machine.

Figure 4 is a fragmentary plan and partly diagrammatic view of the edge controller portion of the quilting machine.

Figure 5 is a section on line 5—5 of Figure 3.

Figure 6 is a fragmentary rear elevational view of the edge cutter portion of the quilting machine.

Figure 7 is a section on line 7—7 of Figure 6.

Figure 7A is an enlarged fragmentary sectional view of the cutting and edge portion of the cutters and feeding wheels.

Figure 8 is a fragmentary plan view of finished quilting material.

Figure 9 is a section on line 9—9 of Figure 8.

Referring to the drawings, the numeral 10 designates an automatic multi-needle quilting stitching machine. Quilting machine 10 includes a frame 11 having yoke carriers 12 and 13 on which grip rollers 14 and 15 carrying respectively the backing 16 and facing 17 of the product are retained. The backing 16 may be cheese cloth or the like, and the facing 17 may be a fabric, such as satin, rayon, etc.

The wadding 18, which may be of cotton or woolen fibers, is retained on a grip roller 19 carried on the yoke carriers 19a on the frame 11.

The aforesaid quilting material components are fed with the facing 17 uppermost, the wadding 18 disposed therebeneath, and the backing 16 undermost, over the apron 20. The quilting material components are retained in position by presser bar 21 and vertically reciprocal rows of stitching needles 22 effect the stitch-work design. The needle spacing patterns are fixed and the design on the quilting material components is changed by varying their movement beneath the needles. This is effected by having the apron mounted on a carriage designated generally by the numeral 23, and moving the carriage 23, apron 20 and the quilting material components carried thereon in a direction of movement angularly disposed or transverse to that of the quilting material components. Controlled transverse movement of the carriage 23 may be effected by conventional cam means 24. By varying the movement of the carriage 23 with different cams, different patterns of stitching, such as diamond, zig zag, curved, circular, etc. patterns may be effected on the quilting components.

The stitched quilting material is passed between knurled feed rollers 25 onto the product take-up roller 26 which is carried on fixedly secured yoke carrier 27.

The foregoing constitutes an abbreviated description of a conventional quilting stitching machine, such as Model No. 2220 made by Karl Lieberknecht, Inc. of Reading, Pennsylvania, successors to Premier Textile Machinery Co., Inc., 440 Mercer Street, Jersey City 6, N. J.

In the quilting machine of my invention photoelectric cell edge controller means designated generally by the numeral 28 and edge trimmer means designated generally by the numeral 29 are provided. Edge trimmer means 29 is carried on post 30 anchored to carriage 23 and includes a motor bracket 31 for motor 32 which drives the edge trimmer means 29, and also an edge trimmer housing 33 containing edge cutter 34.

Edge cutter 34 comprises a pair of shafts 35 and 36, which are preferably angularly disposed towards each other at a very minor angle, such as at an angle of 1/4 degree or so. The convergency of the shafts 35 and 36 is such that the convergency is maximal at the end portions of the shafts 35 and 36 at which the disc cutters 42a and 42b are positioned. The disposition of the shafts at the aforesaid slight angle serves the useful purpose set forth below. Shafts 35 and 36 are geared to each other by respective spur gears 37 and 38, which in turn are driven by pinion gear 39 on the motor shaft 40.

Cutting of the quilting material is effected by disc cutters 42a and 42b which are mounted respectively on shafts 36 and 35. The peripheral edge of each of the cutters or cutting wheels 42a and 42b is relieved to the extent of about 1° in order to provide a superior cutting edge. Thus, as shown in Figure 7a the outer 3/8 inch portion of cutters 42a and 42b can be cut away on both sides in converging directions at a one degree angle.

A pair of toothed feeding wheels 43a and 43b are juxtaposed to the outer faces of respective cutters 42a and 42b. The teeth of feeding wheels 43a and 43b serve to feed the quilting material to the cutters. Thus, the combination of the teeth and the slight angle of convergency, namely the 1/4 degree angle of convergency of shafts 35 and 36 hereinabove referred to, combine to urge the quilting material edge disposed adjacent such cutters towards cutters 42a and 42b.

Lock nuts 70 and 71 are provided on the free ends of shafts 35 and 36 for retaining the cutters 42a and 42b and feeding wheels 43a and 43b in operative position. Washers 73 and 74 are disposed intermediate respective lock nut 70 and cutting wheel 42b, and lock nut 71 and feeding wheel 43a in order to spring-load the cutters and provide for a minor degree of play.

The line passing between the juxtaposed faces of cutters 42a and 42b is, of course, fixed and defines the cut edge of the quilting material. Rotary movement of the cutting wheels 42a and 42b results in entrapment of the edge portion of the quilting material therebetween, and simultaneous cutting and pinking or compressing thereof. This simultaneous compression and cutting avoids frayed edges, and the resultant edge is clean and without irregular dangling projections. The cut discard material falls from the edge as a continuous thin band or web designated A.

A short support rod 44, clamped or otherwise secured to post 30 may be retained beneath the cutting wheels 42a and 42b to ensure an even and taut feed to the cutting wheels 42a and 42b. A roller 60 is carried on bearings 61 and 62 (bearing 61 being on post 63) above the cutting wheels 42a and 42b and in back of the quilting material and aids in maintaining the quilting material taut for cutting.

Due to the uneven winding of the quilting material components on their respective grip rollers, and other mechanical faults, the edge portion of the quilting material presented to cutting wheels 42a and 42b will not be of uniform width if the only control of the quilting material movement is its forward movement. Under these circumstances there is a possibility of serious errors, as in some cases, during the course of forming a single role of product, the cutting wheels 42a and 42b would be cutting at various times a wide band of discarded material, and at other times, a relatively narrow band of discard material, or perhaps might even be free of the quilting material.

However, in the quilting machine of my invention these difficulties are largely or entirely avoided by edge controller means 28. Edge controller means 28 includes a light and photoelectric cell unit 45, secured by means of bracket 45-a to the upper surface of apron 20. Photoelectric cell unit 45 comprises a small light bulb 46 spaced from a photoelectric cell 47. The quilting material is moved in the space between light bulb 46 and photoelectric cell 47. The photoelectric cell 47 is connected to a suitable amplifier unit of conventional design, diagrammatically shown as 48, and thence to a reversible motor 49 having a gear 50 secured on a motor shaft 51. Gear 50 engages with and drives gear 52 carried on shaft 53. Coaxial with gear 52 is relatively small diametered gear 54 which engages with control gear 55 carried on shaft 56. A crank 57 is fixedly secured to the face of control gear 55. A collar 58 is fixedly secured to grip roller 15. Collar 58 is provided with a centrally positioned circumferential groove 59 in which the arm of crank 57 rides or is seated.

The photoelectric cell unit 45 is set to align and control the edge relationship of the quilting material with the cutting wheels 42a and 42b. Thus, whenever the free edge of the quilting material shifts in one direction or another, the photoelectric cell unit 45 actuates the reversible motor 49 which urges the crank 57 in the direction opposite to the direction of shift, the crank riding in collar 58 urges the grip roller 15 on its yoke carrier 12 in said direction. The motor 49 is stopped by the photoelectric cell unit 45 when the free edge of the quilting material is properly aligned with the photoelectric cell unit 45, and is not actuated again until the free edge shifts.

In this manner the free edge of the quilting material is aligned with the cutting wheels 42a and 42b and a straight and continuous trimmed edge is obtained.

Figures 8 and 9 show the finished quilting material structure with the backing 16, wadding 18 and facing 17 retained together by means of stitching 64.

Although I have shown one form of quilting machine, it is to be understood that the cutter of my invention may be used in combination with other embodiments of quilting or stitching machines; and that the quilting machine of my invention may incorporate various carriage and needle mechanisms.

Although the embodiment of the present invention has been described in detail, the scope thereof is not to be limited except as provided for in the here-appended claims.

I claim:

1. In a stitching machine in which a web of material is advanced in operative relationship to a bank of reciprocally movable needles, which bank of needles performs a sewing operation on the web of advancing material, the improvement which comprises a frame carrying said bank of reciprocally movable needles, means for driving said bank of needles to perform a sewing operation on the web of material, edge cutter means positioned at one side of the frame on which said bank of needles are carried for trimming an edge of the advancing web of material upon which the sewing operation is performed by the bank of needles, said edge cutter means including a pair of oppositely rotating shafts, means for rotating said shafts, a toothed feeding wheel and a cutter disk juxtaposedly and coaxially mounted on each of said shafts with the juxtaposed faces of the feeding wheel and cutter disk on each shaft being contiguous, the non-contiguous radial faces of the cutter disks lying in substantially parallel planes which are generally normal to the plane of the web of advancing material, the common tangent to the peripheral edges of the cutter disks at the closest point of mutual proximity of the cutter disks lying generally in a plane generally normal to the plane of the non-contiguous radial faces of the cutter disks, with each of the toothed feeding wheels having a greater radial dimension than the contiguous cutting disk so that a portion of the toothed feeding wheels overlap.

2. In a stitching machine in which a web of material is advanced in operative relationship to a bank of reciprocally movable needles, which bank of needles performs a sewing operation on the web of advancing material, the improvement which comprises a frame carrying said bank of reciprocally movable needles, means for driving said bank of needles to perform a sewing operation on the web of material, edge cutter means positioned at one side of the frame on which said bank of needles are carried for trimming an edge of the advancing web of material upon which the sewing operation is performed by the bank of needles, said edge cutter means including a pair of oppositely rotating shafts, means for rotating said shafts, a toothed feeding wheel and a cutter disk juxtaposedly and coaxially carried on each of said shafts with the juxtaposed faces of the feeding wheel and cutter disk on each shaft being contiguous, resilient means on at least one of said shafts for resiliently limiting the rotational movement of the cutter disk and toothed wheel carried by said shaft, the non-contiguous radial faces of the cutter disks lying in substantially parallel planes which are generally normal to the plane of the web of advancing material, the common tangent to the peripheral edges of the cutter disks at the closest point of mutual proximity of the cutter disks lying generally in a plane generally normal to the plane of the non-contiguous radial faces of the cutter disks, with each of the toothed feeding wheels having a greater radial dimension than the contiguous cutting disk so that a portion of the toothed feeding wheels overlap.

3. In a stitching machine in which a web of material is advanced in operative relationship to a bank of reciprocally movable needles, which bank of needles performs a sewing operation on the web of advancing material, the improvement which comprises a frame carrying said bank of reciprocally movable needles, means for driving said bank of needles to perform a sewing operation on the web of material, edge cutter means positioned at one side of the frame on which said bank of needles are carried for trimming an edge of the advancing web of material upon which the sewing operation is performed by the bank of needles, said edge cutter means including a pair of oppositely rotating shafts, means for rotating said shafts, a toothed feeding wheel and a circular cutter disk juxtaposedly and coaxially mounted on each of said shafts with the juxtaposed faces of the feeding wheel and cutter disk on each shaft being contiguous, the peripheral portion of the faces of the cutter disks being relieved, the non-contiguous radial faces of the cutter disks lying in substantially parallel planes which are generally normal to the plane of the web of advancing material, the common tangent to the peripheral edges of the cutter disks at the closest point of mutual proximity of the cutter disks lying generally in a plane generally normal to the plane of the non-contiguous radial faces of the cutter disks, with each of the toothed feeding wheels having a greater radial dimension than the contiguous cutting disk so that a portion of the toothed feeding wheels overlap.

4. In a stitching machine in which a web of material is advanced in operative relationship to a bank of reciprocally movable needles, which bank of needles performs a sewing operation on the web of advancing material, the improvement which comprises a frame carrying said bank of reciprocally movable needles, means for driving said bank of needles to perform a sewing operation on the web of material, edge cutter means positioned at one side of the frame on which said bank of needles are carried for trimming an edge of the advancing web of material upon which the sewing operation is performed by the bank of needles, said edge cutter means including a pair of oppositely rotating shafts, said shafts being angularly disposed to each other at an angle consisting of a minor fraction of one degree, with the converging end portions of the shafts positioned at the outside of the frame adjacent the outer edge of the advancing web of material, means for rotating said shafts, a toothed feeding wheel and a cutter disk juxtaposedly and coaxially mounted on the converging end portion of each of said shafts with the juxtaposed faces of the feeding wheel and cutter disk on each shaft being contiguous, the non-contiguous radial faces of the cutter disks lying in substantially parallel planes which are generally normal to the plane of the web of advancing material, the common tangent to the peripheral edges of the cutter disks at the closest point of mutual proximity of the cutter disks lying generally in a plane generally normal to the plane of the non-contiguous radial faces of the cutter disks, with each of the toothed feeding wheels having a greater radial dimension than the contiguous cutting disk so that a portion of the toothed feeding wheels overlap.

5. In a stitching machine in which a web of material is advanced in operative relationship to a bank of reciprocally movable needles, which bank of needles performs a sewing operation on the web of advancing material, the improvement which comprises a frame carrying said bank of reciprocally movable needles, means for driving said bank of needles to perform a sewing operation on the web of material, edge cutter means positioned at one side of the frame on which said bank of needles are carried for trimming an edge of the advancing web of material upon which the sewing operation is performed by the bank of needles, said edge cutter means including a pair of oppositely rotating shafts, means for rotating said shafts, a cutter disk mounted on each of said shafts, said cutter disks being mounted in staggered relationship to each other with a radial face of one disk lying in the general plane of a radial face of the other disk, a toothed feeding wheel juxtaposed to the radial face of each cutter disk opposite the aforementioned face, each of the toothed feeding wheels having a greater radial dimension than its contiguous cutter disk.

6. In a stitching machine in which a web of material is advanced in operative relationship to a bank of reciprocally movable needles, which bank of needles performs a sewing operation on the web of advancing material, the improvement which comprises a frame carrying said bank of reciprocally movable needles, means for driving said bank of needles to perform a sewing operation on the web of material, edge cutter means positioned at one side of the frame on which said bank of needles are carried for trimming an edge of the advancing web of material upon which the sewing operation is performed by the bank of needles, said edge cutter means including a pair of oppositely rotating shafts, means for rotating said shafts, a cutter disk mounted on each of said shafts, said cutter disks being mounted in staggered relationship to each other with a radial face of one disk lying in the general plane of a radial face of the other disk, the common tangent to the peripheral edges of the cutter disks at the closest point of mutual proximity of the cutter disks lying generally in a plane generally normal to the last-mentioned plane, a toothed feeding wheel juxtaposed to the radial face of each cutter disk opposite the aforementioned face, each of the toothed feeding wheels having a greater radial dimension than its contiguous cutter disk.

7. In a stitching machine in which a web of material is advanced in operative relationship to a bank of reciprocally movable needles, which bank of needles performs a sewing operation on the web of advancing material, the improvement which comprises a frame carrying said bank of reciprocally movable needles, means for driving said bank of needles to perform a sewing operation on the web of material, edge cutter means positioned at one side of the frame on which said bank of needles are carried for trimming an edge of the advancing web of material upon which the sewing operation is performed by the bank of needles, said edge cutter means including a pair of oppositely rotating shafts, means for rotating said shafts, said shafts being angularly disposed to each other at an angle consisting of a minor fraction of one degree, with the converging end portions of the shafts positioned at the outside of the frame adjacent the outer edge of the advancing web of material, a cutter disk mounted on the converging end portion of each of said shafts, said cutter disks being mounted in staggered relationship to each other with a radial face of one disk lying in the general plane of a radial face of the other disk, a toothed feeding wheel juxtaposed to the radial face of each cutter disk opposite the aforementioned face, each of the toothed feeding wheels having a greater radial dimension than its contiguous cutter disk.

8. Edge cutter means for trimming the edge portion of a web of advancing material including a pair of oppositely rotating shafts, means for rotating said shafts, a toothed feeding wheel and a cutter disk juxtaposedly and coaxially mounted on each of said shafts with the juxtaposed faces of the feeding wheel and cutter disk on each shaft being contiguous, the non-contiguous radial faces of the cutter disks lying in substantially parallel planes which are generally normal to the plane of the web of advancing material, the common tangent to the peripheral edges of the cutter disks at the closest point of mutual proximity of the cutter disks lying generally in a plane generally normal to the plane of the non-contiguous radial faces of the cutter disks, with each of the toothed feeding wheels having a greater radial dimension than the contiguous cutting disk so that a portion of the toothed feeding wheels overlap.

9. Edge cutter means for trimming the edge portion of a web of advancing material including a pair of oppositely rotating shafts, means for rotating said shafts, a toothed feeding wheel and a cutter disk juxtaposedly and coaxially carried on each of said shafts with the juxtaposed faces of the feeding wheel and cutter disk on each shaft being contiguous, resilient means on at least one of said shafts for resiliently limiting the rotational movement of the cutter disk and toothed wheel carried by said shaft, the non-contiguous radial faces of the cutter disks lying in substantially parallel planes which are generally normal to the plane of the web of advancing material, the common tangent to the peripheral edges of the cutter disks at the closest point of mutual proximity of the cutter disks lying generally in a plane generally normal to the plane of the non-contiguous radial faces of the cutter disks, with each of the toothed feeding wheels having a greater radial dimension than the contiguous cutting disk so that a portion of the toothed feeding wheels overlap.

10. Edge cutter means for trimming the edge portion of a web of advancing material including a pair of oppositely rotating shafts, means for rotating said shafts, a toothed feeding wheel and a circular cutter disk juxtaposedly and coaxially mounted on each of said shafts with the juxtaposed faces of the feeding wheel and cutter disk on each shaft being contiguous, the peripheral portion of the faces of the cutter disks being relieved, the non-contiguous radial faces of the cutter disks lying in substantially parallel planes which are generally normal to the plane of the web of advancing material, the common tangent to the peripheral edges of the cutter disks at the closest point of mutual proximity of the cutter disks lying generally in a plane generally normal to the plane of the non-contiguous radial faces of the cutter disks, with each of the toothed feeding wheels having a greater radial dimension than the contiguous cutting disk so that a portion of the toothed feeding wheels overlap.

11. Edge cutter means for trimming the edge portion of a web of advancing material including a pair of oppositely rotating shafts, said shafts being angularly disposed to each other at an angle consisting of a minor fraction of one degree, with the converging end portions of the shafts positioned at the outside of the frame adjacent the outer edge of the advancing web of material, means for rotating said shafts, a toothed feeding wheel and a cutter disk juxtaposedly and coaxially mounted on the converging end portion of each of said shafts with the juxtaposed faces of the feeding wheel and cutter disk on each shaft being contiguous, the non-contiguous radial faces of the cutter disks lying in substantially parallel planes which are generally normal to the plane of the web of advancing material, the common tangent to the peripheral edges of the cutter disks at the closest point of mutual proximity of the cutter disks lying generally in a plane generally normal to the plane of the non-contiguous radial faces of the cutter disks, with each of the toothed feeding wheels having a greater radial dimension than the contiguous cutting disk so that a portion of the toothed feeding wheels overlap.

12. Edge cutter means for trimming the edge portion of a web of advancing material including a pair of oppositely rotating shafts, means for rotating said shafts, a cutter disk mounted on each of said shafts, said cutter disks being mounted in staggered relationship to each other with a radial face of one disk lying in the general plane of a radial face of the other disk, a toothed feeding wheel juxtaposed to the radial face of each cutter disk opposite the aforementioned face, each of the toothed feeding wheels having a greater radial dimension than its contiguous cutter disk.

13. Edge cutter means for trimming the edge portion of a web of advancing material including a pair of oppositely rotating shafts, means for rotating said shafts, a cutter disk mounted on each of said shafts, said cutter disks being mounted in staggered relationship to each other with a radial face of one disk lying in the general plane of a radial face of the other disk, the common tangent to the peripheral edges of the cutter disks at the closest point of mutual proximity of the cutter disks lying generally in a plane generally normal to the last-mentioned plane, a toothed feeding wheel juxtaposed to the radial face of each cutter disk opposite the aforementioned face, each of the toothed feeding wheels having a greater radial dimension than its contiguous cutter disk.

14. Edge cutter means for trimming the edge portion of a web of advancing material including a pair of oppositely rotating shafts, means for rotating said shafts, said shafts being angularly disposed to each other at an angle consisting of a minor fraction of one degree, with the converging end portions of the shafts positioned at the outside of the frame adjacent the outer edge of the advancing web of material, a cutter disk mounted on the converging end portion of each of said shafts, said cutter disks being mounted in staggered relationship to each other with a radial face of one disk lying in the general plane of a radial face of the other disk, a toothed feeding wheel juxtaposed to the radial face of each cutter disk opposite the aforementioned face, each of the toothed feeding wheels having a greater radial dimension than its contiguous cutter disk.

References Cited in the file of this patent

UNITED STATES PATENTS

| 884,833 | Meeker | Apr. 14, 1908 |
| 1,422,901 | Terry | July 18, 1922 |
| 1,561,803 | Smith | Nov. 17, 1925 |
| 1,662,871 | Swift | Mar. 20, 1928 |
| 1,760,112 | Brogan | May 27, 1930 |
| 1,782,700 | Sheperdson | Nov. 25, 1930 |
| 1,948,876 | Boettcher | Feb. 27, 1934 |
| 2,114,962 | Karle | Apr. 19, 1938 |
| 2,159,717 | Sigoda | May 23, 1939 |
| 2,448,934 | Van Derhoef | Sept. 7, 1948 |
| 2,675,437 | Theobald | Apr. 13, 1954 |
| 2,708,394 | Allen | May 17, 1955 |